July 31, 1934.   J. S. BOGGS   1,968,598
CONCRETE PRESSURE PIPE
Filed Oct. 3, 1931   2 Sheets-Sheet 1
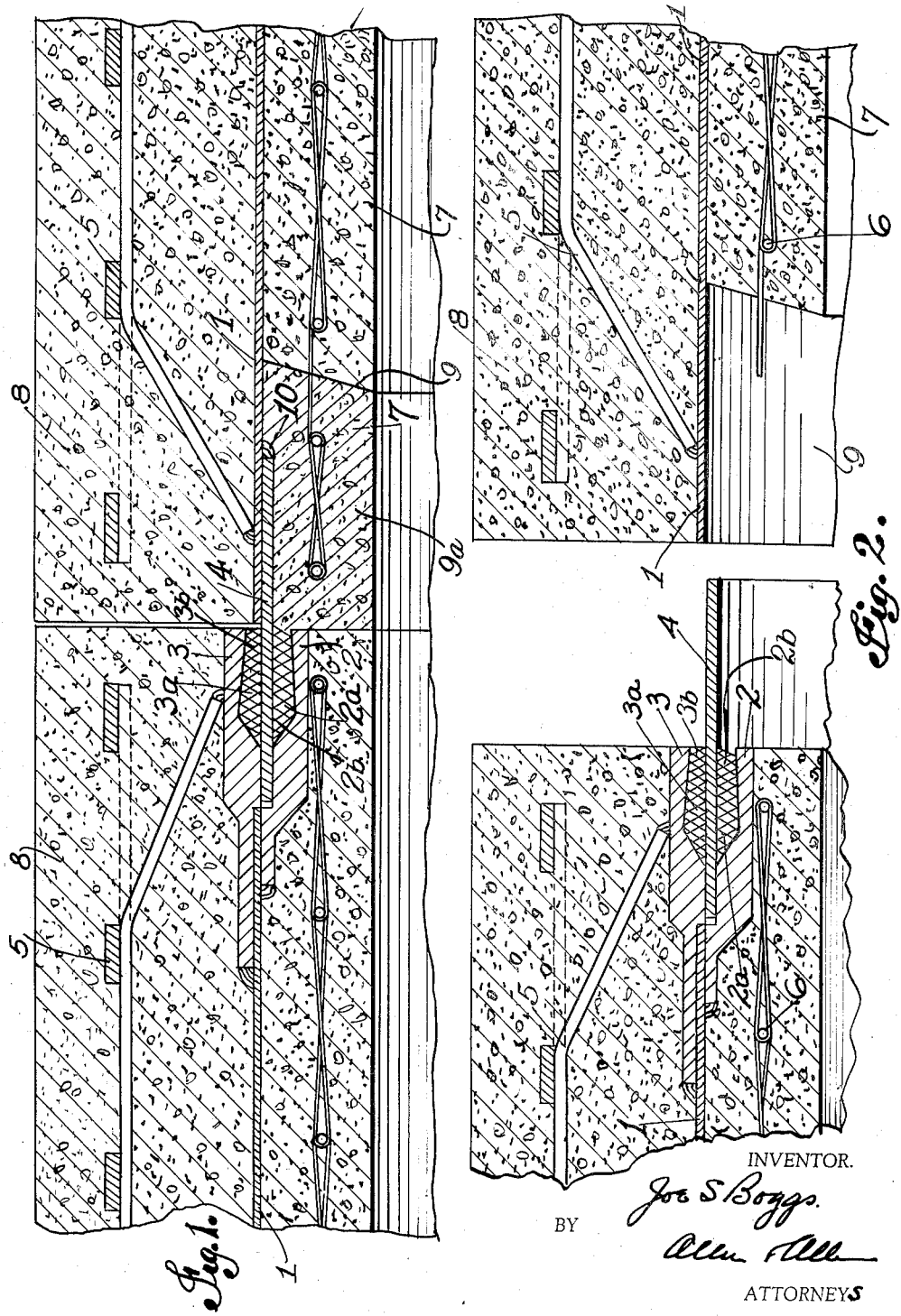
INVENTOR.
Joe S. Boggs.
BY
ATTORNEYS

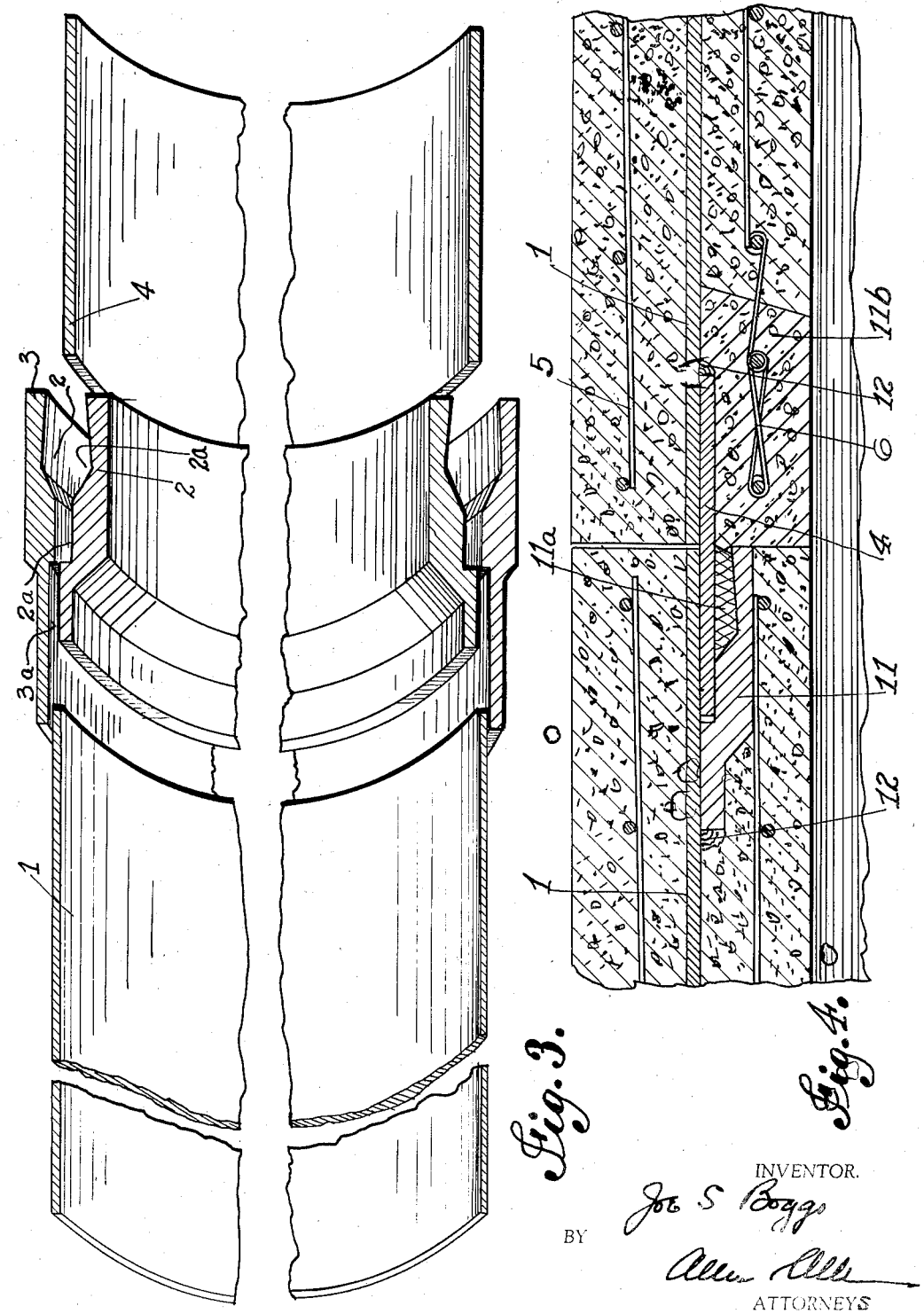

Patented July 31, 1934

1,968,598

UNITED STATES PATENT OFFICE 1,968,598

CONCRETE PRESSURE PIPE

Joe S. Boggs, Frankfort, Ky., assignor to Kentucky Concrete Pipe Company, Inc., Frankfort, Ky., a corporation of Kentucky Application October 3, 1931, Serial No. 566,656

6 Claims. (Cl. 72—53)

My invention relates to concrete pipe for use particularly in sustaining pressure, and to a special joint for use in such pipes, whereby expansion is provided for in a convenient and economical manner.

In the formation of pressure pipe from concrete, the usual practice is to provide a metal form consisting of a steel or iron cylinder, together with reinforcement in the shape of rods and wires, and then pouring the pipe usually at the point of use, so as to cover and line the metal structure. The sections of pipe are formed with bell ends and spigot ends, so that they fit into each other, with the intermediate space filled with cement or concrete. In some cases it has been the practice to provide sealing rings which are set in place when the pipes are placed together, and sealed with some suitable packing, such as a lead ring, which is caulked from the interior of the pipe.

This last noted practice usually requires two sealing rings, one in the bell end of a pipe and the other in the spigot end of the adjacent pipe, each of the sealing rings being welded to the metal cores of the said pipes prior to pouring, and with an annular depression left in one of the rings for caulking. The space left in the concrete body of the pipe to permit of this operation is then filled with suitable cement, which is also reinforced, thus leaving a smooth interior for the pipe.

This form of joint provides for expansion, and it is over this form of joint that my invention provides a number of improvements.

Instead of having the two pipes connected by metal rings additional to the steel cores of the pipes themselves with a caulked lead seal between them, I provide for a poured lead joint between a suitable sealing ring and the steel core at what may be termed the spigot end of a concrete pipe, and when the pipes are assembled this ring enters an exposed portion of metal, preferably the steel core of the bell end of the adjacent pipe, and is welded thereto from the interior of the joined pipes.

I am thus enabled to provide for a complete poured joint under factory conditions as distinguished from field conditions, which joint may be additionally caulked, if desired. The use of a pre-cast lead seal is avoided, and a more economical poured seal is provided, providing for expansion in an improved manner. It is not necessary to secure sealing rings to each end of each pipe section, and the fact that the operation is carried out in the factory instead of in the field insures a perfect joint and avoids transportation of extra parts and other field difficulties.

I have illustrated in the drawings several modes of use of my invention, in order to disclose the subject matter of my invention, and in the appended claims, to which reference is hereby made, I set forth the inventive features involved.

In the drawings:

Figure 1 is a section taken through half of a completed joint in two concrete pipes according to my invention.

Figure 2 is a view of the parts similar to Figure 1, but not yet joined together.

Figure 3 is a perspective view of the metal core parts by themselves.

Figure 4 is a section like Figure 1, showing a modified form of sealing ring structure and a modified form of outer and inner reinforcement for the concrete portion of the pipe.

In the first illustration of my invention I provide for each pipe a section of steel tubing or pipe 1 to act as what I have termed a "core". Each pipe has its opposite ends equipped to provide what I will term a bell end and a spigot end, although accurately speaking, the ultimate concrete pipe ends abut flat against each other when the pipe is completed.

The end of the core pipe which is to be the spigot end in this first form illustrative of my invention has secured to its end an inner ring 2 and outer ring 3, these two rings being welded in place to the end of the steel pipe core. The two rings are provided with matching cavities 2a and 3a, and the space left between the inner faces of the rings accommodates a sealing ring or tube 4.

When the rings 2 and 3 have been welded in place, the tube 4 is inserted between the rings, the ring faces being so arranged that this tube 4 lies just inside the inner circumference of the core pipe 1, if extended, and will fit snugly into the exposed end of a like core pipe in another concrete pipe section.

When the tube 4 or sealing ring has been inserted in place, portions 2b and 3b of lead are poured around the respective sides thereof so as to fill the cavities 2a and 3a, respectively, and form a double expansion seal for the tube 4. If required, this poured joint can also be caulked.

After the joint is poured, the usual rod and ring reinforcement, generally indicated at 5, may be mounted on the core tube, or the reinforcement may be shipped separately to the job and there installed.

On the job the complete core formed as above described is set into a form with suitable reinforcement 6 on the inside of it, and concrete is poured into the form, thus enclosing the core structure with inner walls 7 and outer walls 8 of concrete.

The pouring is so done as to leave a cavity 9 in the inside wall of the poured body, thus exposing the core tube itself at the bell end of the pipe. The concrete is poured so as to come flush with the lead seal at the spigot end of the pipe.

When pipes so formed are set together, the tube 4 of the spigot end is thrust into the core tube at the bell end of the adjacent pipe and enters the main core tube at the said pipe, where it is exposed by the cavity 9.

The workman then enters the combined pipe sections and electrically welds the inner end of the tube 4 or sealing ring to the core tube, as indicated at 10. The cavity is then reinforced, if desired, and filled with cement or concrete 9a, so as to finish the interior of the pipe, and the joint is complete.

If desired, before the pipe sections are thrust against each other, they are coated with asphalt, so as to make a tight joint where they abut. The welded joint is simple make, and entirely tight. The lead seal itself is capable of being perfectly made under factory conditions, and is a poured joint, as distinguished from a caulked joint of precast metal.

In the modified form, it will be noted that the core tubes 1 are used as before, but in this instance, instead of using two rings for retaining the seal about the sealing ring or tube 4, this is provided by one ring and the body of the core tube 1. Thus the ring 11 is provided, which fits over the tube 1 at the bell end of the pipe and has a cavity 11a for the poured seal, and a cavity 11b for seating the tube 4. After the ring 11 has been welded in place, as at 12, the tube 4 is thrust over the end of the core tube 1, into the recess formed at 11b, and lead is poured into the cavity 11a about the tube 4, thus forming the joint as before.

In this instance wire reinforcement is employed on both sides of the core in pouring the pipe. Otherwise the construction is the same as in the first instance.

It will be apparent that other forms of construction could readily be employed exhibiting the feature of importance of the two forms now described. By the use of the term "concrete" in this specification, I include other ceramic material useful for the same purpose.

Having thus described my invention, what I claim as new and desire to secure by Letters Patent, is:—

1. A concrete pipe section ready for installation comprising an internal core embedded in the concrete, said core embodying at one end thereof a core tube extending through the concrete body, and a projecting tube sealed with respect to the core tube within the body of concrete by a poured lead joint, and embodying inside its other end, a tubular portion internally devoid of concrete into which projecting tube another like section will fit.

2. A concrete pipe construction comprising concrete pipe sections each having an internal core embedded in the concrete, each of said cores embodying at one end thereof a core tube extending through the concrete body, and a projecting tube sealed with respect to the core tube by a poured lead joint, and at least one section embodying inside its other end, a tubular portion internally devoid of concrete into which a like projecting tube of the other section fits, and a welded joint between the said tubular portion and the said projecting tube that fits therein, and a covering for said tube and said weld, forming part of the lining of the pipe construction.

3. A concrete pipe section ready for installation with other like sections comprising a tubular core and inner and outer layers of concrete, the inner layer being discontinued short of the end of the tubular core at one end of the section forming a bell end, a tubular member extending past the concrete layers at the opposite end of the section, and means connecting said extending tubular member to the adjacent end of the tubular core comprising readily fusible metal poured into contact with said extending member and terminating at the outer end of said recess and forming a leak-proof expansion joint between said member and said core, said extending member being of diameter to fit into a bell joint formed as above described in an adjacent pipe section, the discontinuance of the inner layer of concrete in the bell end permitting free access for welding the extended member to the interior of the core of the adjacent section.

4. In combination, two concrete pipe sections joined together at their ends, each section comprising a tubular core between inner and outer layers of concrete, one section having the inner layer of concrete discontinued short of the end of its tubular core and the other section comprising a tubular extension, and means connecting said tubular extension to the adjacent end of the tubular core of said other section comprising readily fusible metal poured into contact with said extension prior to connection of the sections and forming a leak-proof expansion joint between said extension and the core, said extension fitting inside the tubular core of the one pipe section and having its end welded to the interior of said core, and a filler filling the space inside said tubular extension between the inner concrete layers of the two pipe sections.

5. A pipe section ready for installation with other like sections comprising a tubular metal core and layers of concrete outside and inside said core, the inner layer being discontinued short of the end of said core at one end of the section, an attachment ring device fixed to the opposite end of the core and embedded in the concrete between the two layers and having an outwardly presented annular recess, a tubular extension member fitting in said annular recess and readily fusible metal poured into contact with said tubular extension within said recess and terminating at the outer end of said recess, said tubular extension being of a diameter that would fit snugly in the opposite end of the core where the concrete layer is discontinued.

6. Two pipe sections with their ends joined together, each section comprising a tubular core, the adjacent end of one core having means comprising an outwardly opening annular recess, a tubular extension member fitting in said recess, and inside the adjacent end part of the tubular core of the other pipe section, a readily fusible metal poured into contact with said tubular extension within said recess prior to connection of the sections, whereby a liquid tight expansion joint is formed between said tubular extension member and the core in the one pipe section, said tubular extension member being welded to the interior of the core of the other pipe section, and a filler completing the inside layer of concrete where the inner layer is discontinued.

JOE S. BOGGS.